United States Patent [19]

Lamer

[11] Patent Number: 4,861,218
[45] Date of Patent: Aug. 29, 1989

[54] MOBILE BOAT HOIST

[75] Inventor: Gerald P. Lamer, Sturgeon Bay, Wis.

[73] Assignee: Marine Travelift, Inc., Sturgeon Bay, Wis.

[21] Appl. No.: 580,879

[22] Filed: Feb. 16, 1984

[51] Int. Cl.⁴ ............................................. B60P 3/10
[52] U.S. Cl. ..................... 414/461; 254/273; 254/281; 254/324; 254/327; 254/339
[58] Field of Search ............... 414/460, 461, 21; 254/270, 273, 281, 324, 326, 327, 399

[56] References Cited

U.S. PATENT DOCUMENTS

| | | | |
|---|---|---|---|
| 2,980,193 | 4/1961 | Baudhuin et al. | |
| 3,040,917 | 6/1962 | Bonnin | 414/460 X |
| 3,144,088 | 8/1964 | Kaplan | 414/21 X |
| 3,409,153 | 11/1968 | Stearn et al. | 414/461 |
| 3,622,025 | 11/1971 | Petersen | |
| 3,640,413 | 2/1972 | Klein | 414/461 |
| 4,042,213 | 8/1977 | Schreyer et al. | 254/270 |
| 4,219,094 | 8/1980 | Sturgill | 414/460 X |
| 4,236,859 | 12/1980 | Stearn et al. | 414/460 |
| 4,358,020 | 11/1982 | Thiele | |
| 4,378,072 | 3/1983 | Appleman et al. | |
| 4,461,459 | 7/1984 | Conti | 254/270 X |
| 4,480,714 | 11/1984 | Yabuta et al. | 414/21 X |

Primary Examiner—David A. Bucci
Attorney, Agent, or Firm—Wall and Roehrig

[57] ABSTRACT

A straddle-type crane having the load-lifting mechanism positioned rearwardly of the transversely-extending cross beam used to effect the parallel spacing of the longitudinally-extending upper support beams from which the load-lifting mechanism is supported. Each of the load-lifting mechanisms is laterally movable relative to the upper support beams, from which they are carried, to facilitate the positioning of the load-lifting mechanism relative to the upper support beam and the load which is to be carried therein.

8 Claims, 2 Drawing Sheets

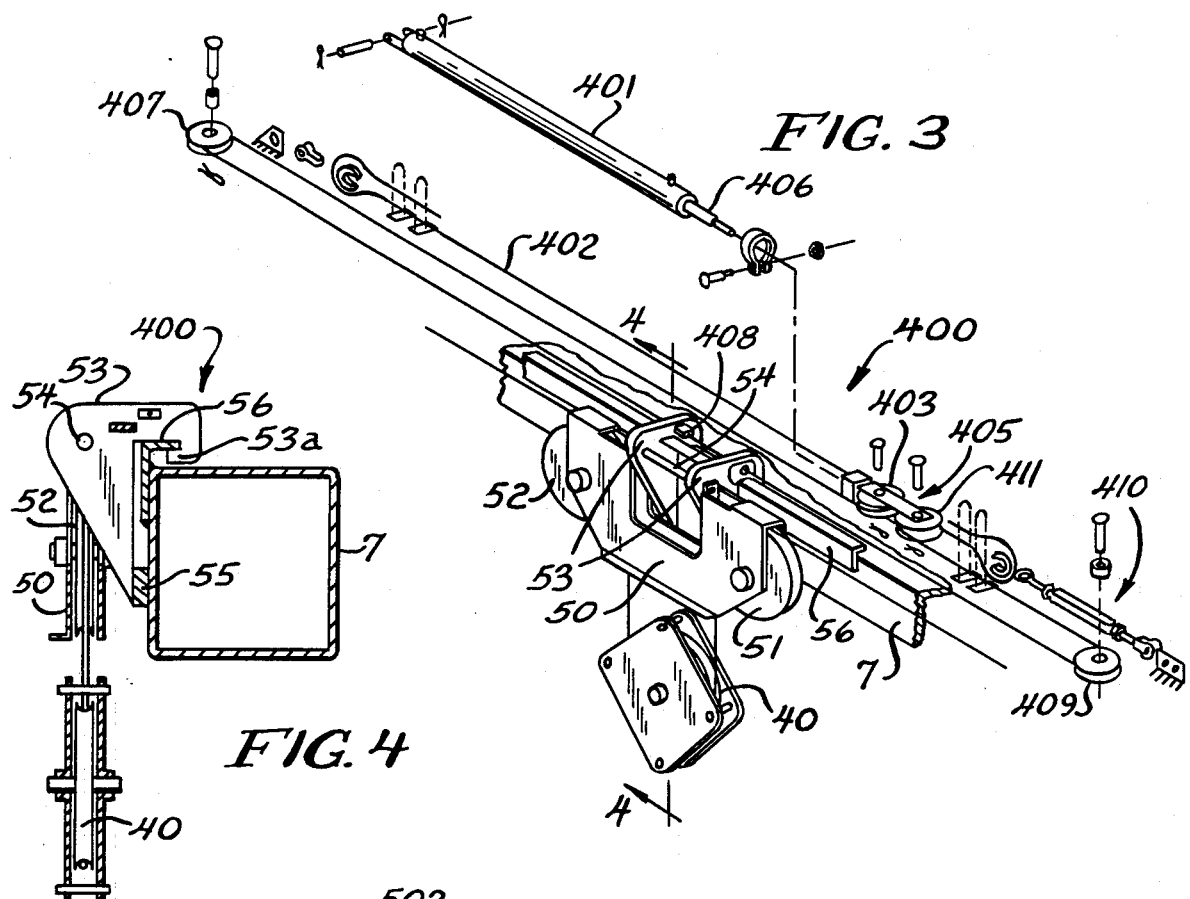
FIG. 3
FIG. 4
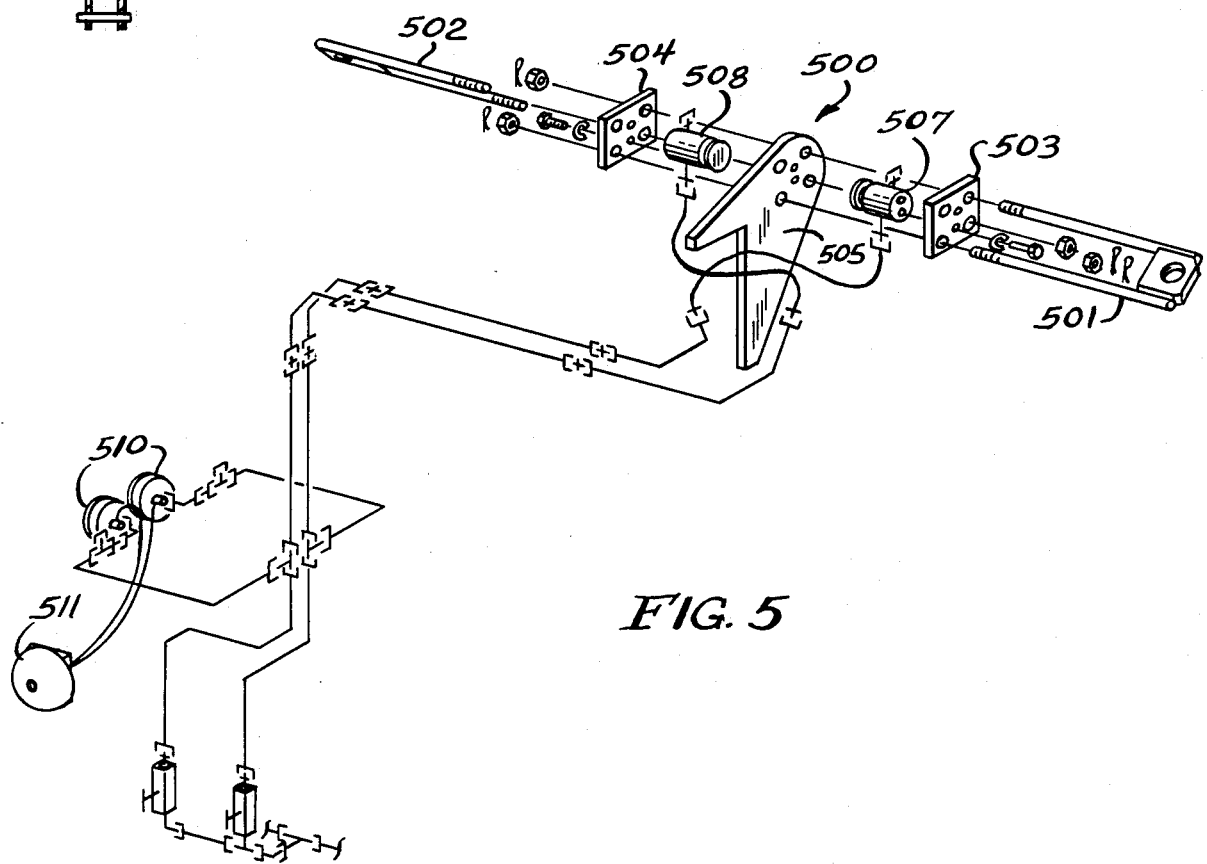
FIG. 5

MOBILE BOAT HOIST

BACKGROUND OF THE INVENTION

This invention relates in general to straddle-type cranes and, in particular, to a straddle-type crane which is especially adapted for use in handling watercraft on land. More specifically, but without restriction to the particular use which is shown and described, this invention relates to a straddle-type mobile hoist, wherein all of the lifting mechanisms may be power adjustable to facilitate the lifting, lowering, and transporting of boats having various hull designs. The lifting mechanisms are all positioned aft of a transversely-extending cross beam which joins the two parallel sides of the straddle crane to facilitate positioning of the lifting mechanism for improved balancing of a load supported therein.

The mobile hoist hereinafter described in detail in especially suitable for use in lifting, lowering, and transporting watercraft and will be described with reference to its use as a sling-rigged boat hoist. However, the structure disclosed hereinafter, and the manner in which that structure functions, can be utilized in applications other than for lifting, lowering, and transporting boats. For convenience of illustration, however, the hoist will be described with reference to its use in such an application.

Straddle-type mobile hoists may be used in harbor facilities to remove boats from the water, place them in storage, or convey them to a repair facility, as well as to remove boats from storage and replace them in the water. To this end, such straddle hoists are sling-rigged, and carry the boat on slings which are supported from an upper portion of the parallel sides of the crane with the slings passing beneath the boat hull to support and cradle the hull therein.

When placing a boat into or removing a boat from the water, these hoists are moved into a position straddling a slip formed between facing edges of two wharves, or piers, spaced a predetermined distance apart. The load-supporting slings may then be raised or lowered relative to the crane structure for removing a boat from the water, or placing the boat into the water, respectively.

Heretofore, such straddle cranes have utilized a forward or fore sling positioned in front of the cross-beam support which connects the parallel-spaced, longitudinally-extending, upper support beams from which the slings are supported. The fore sling has been supported in front of the transversely-extending cross beam in a fixed position which precludes the forward sling from being moved fore or aft relative to the transversely-extending upper support beams. Consequently, with such fixedly positioned forward slings, it is more difficult from the crane operator to correctly position the boat hoist to accommodate seacraft having sharply pitched hulls.

Frequently, with such straddle cranes, the boat has to be loaded onto the slings in a reverse direction so that the rear sling can be moved relative to the upper support beams in order to accommodate the shape of the boat hull. However, while such positioning will permit a better grip on a sharply pitched boat hull, loading in such a manner can also result in an undesirable weight distribution of the boat relative to the straddle hoist.

SUMMARY OF THE INVENTION

It is, therefore, an object of this invention to improve straddle-type mobile hoists.

Another object of this invention is to position all of the lifting mechanisms of the straddle hoist to the rear of the transversely-extending cross member which joins the parallel, longitudinally-extending upper support beams.

Still another object of this invention is to laterally adjust and position all of the load-lifting mechanisms relative to the longitudinally-extending upper support beams from which these load-lifting mechanisms are supported.

These and other objects are attained in accordance with the present invention, wherein there is described one embodiment of a straddle-type crane having the load-lifting mechanism positioned rearwardly of the transversely-extending cross beam used to effect the parallel spacing of the longitudinally-extending upper support beams from which the load-lifting mechanism is supported. Each of the load-lifting mechanisms is laterally movable relative to the upper support beams, from which they are carried, to facilitate the positioning of the load-lifting mechanism relative to the upper support beam and the load which is to be carried therein.

DESCRIPTION OF THE DRAWINGS

Further objects of the invention, together with additional features contributing thereto and advantages occurring therefrom, will be apparent from the following description of a preferred embodiment of the invention which is shown in the accompanying drawings with like reference numerals indicating corresponding parts throughout. While the drawings illustrate a preferred embodiment of the invention, and the best manner presently known for carrying out the invention, it is to be understood that these drawings only depict one embodiment of the invention, and that the invention may be incorporated in embodiments other than that which is shown in the drawings, wherein:

FIG. 3 is an enlarged perspective view of a portion of the longitudinally-extending upper support beam, and the lifting mechanism to illustrate the manner in which the lifting mechanisms are transversely movable relative to the parallel longitudinally-extending support beams;

FIG. 4 is an enlarged partial cross-sectional view of a portion of the load-lifting mechanism illustrated in FIG. 3 taken in the direction of line 4—4; and FIG. 5 is an exploded perspective view of a load-sensing mechanism utilized to notify a machine operator of the force applied to the load-lifting mechanism.

DESCRIPTION OF A PREFERRED EMBODIMENT

Figure 1:
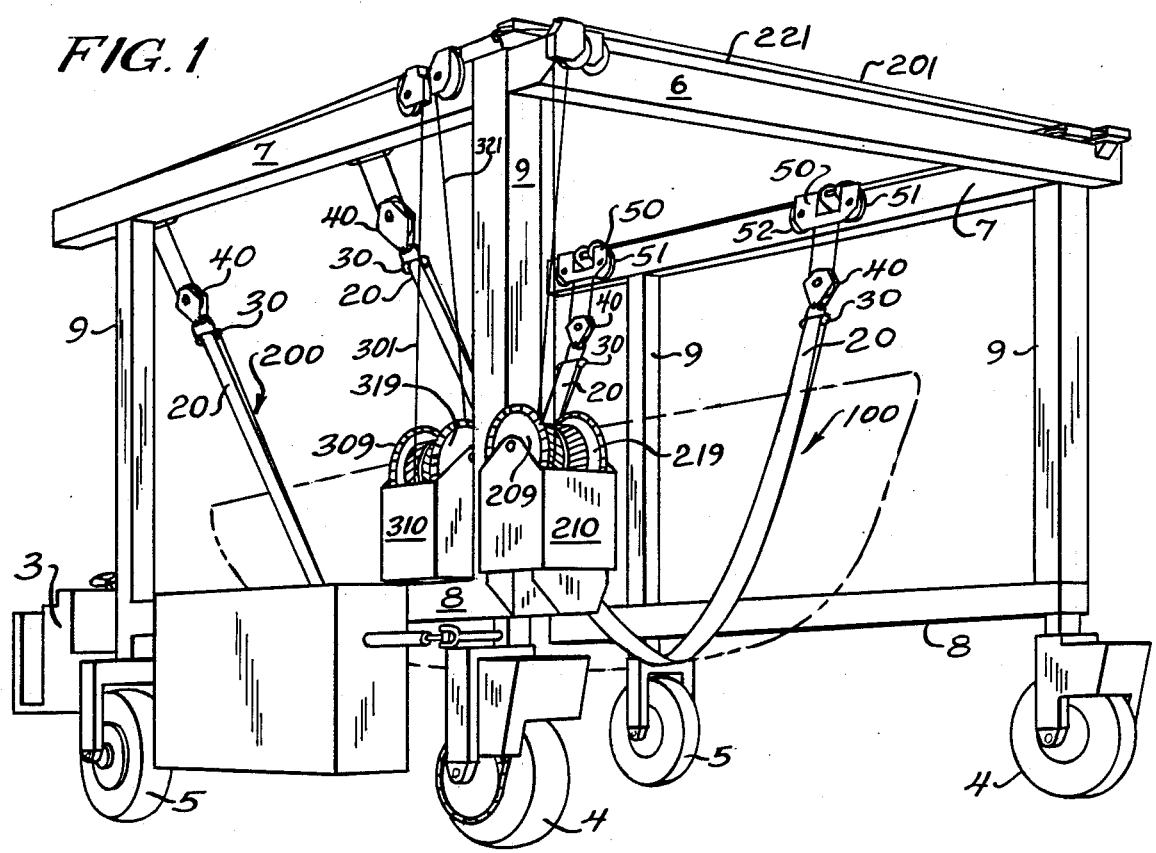
FIG. 1 is a frontal perspective view of a straddle-type mobile hoist illustrating the location of the lifting mechanism behind the transversely-extending cross beam, and showing the lateral mobility thereof relative to the upper longitudinallyextending support beams.

Referring now to FIG. 1, there is shown an straddle-type crane sling-rigged for lifting, lowering, or carrying a boat such as illustrated in phantom. As is known to those skilled in the art, these boats are generally of such a size that they cannot be launched and removed from the water by vehicle-drawn trailers, or the physical launch facilities are such that a conventional sloped-grade launching ramp is not possible. The hoist includes a forward or fore-sling assembly 100 and a rear or aft-sling assembly 200 carried toward the front and rear of the hoist, respectively. Each of the slings comprise a web of material, or belt, 20 connected at each end to a bar 30 supported from a vertically movable pulley 40. The pulley 40 is supported by a cable extending downwardly from a supporting sheave block 50 which includes a pair of sheaves 51, 52, which are rotatably supported in the sheave block 50 and over which the cable passes.

The rearward or aft end of the hoist (not shown) is entirely open, and the forward end is joined by a transversely-extending upper cross-beam support 6 which connects and spaces apart two parallel longitudinally-extending, upper support beams 7. This structure is carried by four vertically-extending columns 9 supported on longitudinally-extending, lower support beams 8. The hoist structure is substantially symmetrical about its longitudinal axis, and is supported upon wheels 4 and 5 carried in the front and rear of the hoist, respectively. The rear wheels 5 are not pivotable relative to the hoist, while the front wheel 4 are pivotable to permit steering and maneuvering of the crane. An operator's station 3 is positioned at the rear of the crane whereby an operator can steer the crane, and control the various lifting, lowering, and positioning functions of the lifting mechanism. The front or cross beam 6 is positioned forward of the front wheel 4 centerline. Such positioning provides added clearance for ship structure such as bow rigging and foredeck, as well as permitting exact positioning of the front or fore sling 100 to achieve optimum load balance.

Figure 2:
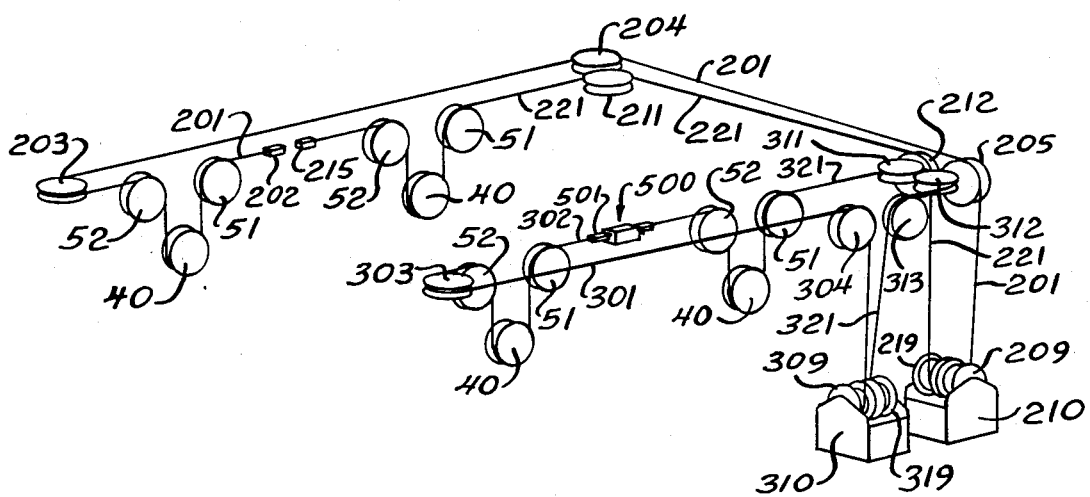
FIG. 2 is a mechanical schematic of the load-lifting mechanism illustrated in FIG. 1 to show the manner in which the load-lifting mechanism operates to raise and lower a load.

Referring to FIG. 1 and FIG. 2, one side or end of the rear or aft sling 200 is supported from a cable 201 fixed at one end 202 to the support beam 7 and passing about the sheaves 51, 52 of the sheave block 50, and the pulley 40 carried therebetween. The cable 201 then passes about sheaves 203, 204, and 205, and is thereafter wound about the drum 209 of the hoist mechanism 210. The other side of the aft sling 200 is similarly supported by means of a cable 301 having one end fixed at 302 to a yoke 501 of a load-sensing device 500 shown in detail in FIG. 5. The cable 301 extends from the yoke 501 of the indicator 500 about the sheaves 51, 52 of the sheave block 50 and the pulley 40 carried therebetween, and then passes about sheaves 303 and 304, and is thereafter wound about the drum 309 of the hoist mechanism 310.

One side of the forward sling 100 is supported by a cable 221 which is secured to a longitudinally-extending, upper support beam 7 at 215, and thereafter passing about the two sheave block pulleys 51, 52 associated with the fore sling 100, and about the pulley sheave 40 carried therebetween. The cable 221 then passes about the sheaves 211 and 212 to the drum 219 of the hoist mechanism 210. In this manner, the operation of the hoist mechanism 210 will simultaneously raise or lower the left side of both the fore and aft slings. While the drums 209 and 219 can both be driven by the same hoist mechanism 210, separate hoist mechanisms could be used for driving each drum.

The other side of the forward sling 100 is supported by a cable 321. One end of cable 321 is connected to a yoke 502 of the load indicator 500 thereafter passes about the two sheave block pulleys 51, 52 associated with the fore sling 100 and about the pulley sheave 40 carried therebetween, to sheaves 311, 312, and 313. The cable 321 then is wound about drum 319 of the hoisting mechanism 310. In this manner, the operation of the hoist mechanism 310 will simultaneously raise or lower the right side of both the fore and aft slings 100 and 200, respectively. As previously described with reference to cables 201 and 221, separate hoist mechanisms could be used for driving each drum 309 and 319.

In order to facilitate positioning of the fore and aft slings 100, 200, respectively, for improving balancing of a boat supported on the slings and to improve distribution of the weight load on the straddle hoist, both of the slings are carried behind or aft of the cross beam 6. These slings, therefore, may be moved laterally relative to the longitudinally-extending, upper support beam 7 by means of a traveler or power-sling adjustment assembly 400, best shown in FIGS. 3 and 4, operatively connected to each end of the respective slings. Since the power-sling adjustment assembly 400 is the same for both sides of the fore and aft slings, for convenience of illustration only one power-sling adjustment assembly will be described in detail.

The sheave block 50, in which sheaves 51 and 52 are rotatably supported and over which one of the cables, 201, 221, 301, or 321, passes in supporting the pulley sheave 40 associated with each end of each sling, is supported from the longitudinally-extending, upper support beam 7. The sheave block 50 is pivotally connected to a pair of hanger brackets 53 by a pivot pin 54 secured to the sheave block 50 and passing through hangers 53. The hangers 53 each include a bearing plate 55 at the lower end which is in contact with the inner-vertical wall of the upper support beam 7. The upper ends of each hanger bracket 53 is formed with a hook-like configuration 53a to engage an inverted L-shaped bracket 56 welded to the inner-vertical wall of the support beam 7 and extending above the upper-horizontal surface of the beam 7 to engage the hook portion 53 for movably securing the sheave block 50 to the upper support beam 7. The pivot pin 54 permits the sheave block 50 to pivot relative to the upper beam 7 in the direction from which a loading force is being applied through the fore and aft slings. In this manner, when a loading force is applied through the slings, the sliding sheave block 50 will pivot relative to the hanger brackets 53 to transmit the force directly through the brackets to the upper support beam 7.

In order to move the sliding sheave-block assembly 50 laterally relative to the upper support beam 7, the power-sling adjustment assembly 400 is used. The assembly includes a hydraulic cylinder 401 and pulley/cable system utilized to effect movement of the sliding-block sheave 50. To this end, the hydraulic cylinder 401 is secured at one end to the upper support beam 7, and has one end of a cable 402 secured to the cylinder casing with the cable passing about the sheave 403 of the movable pulley block assembly 405, which is connected to the plunger 406 of the hydraulic cylinder. As the plunger 406 is extended from or retracted within the hydraulic cylinder 401, like movement of the pulley block 405 is effected. The cable 402 then passes about a fixed sheave 407, rotatably supported by the upper support beam 7 by means of a suitable bracket (not shown), and then to the hanger brackets 53 to which the cable 402 is secured by means of a wire-rope clip 408 for movement therewith. The cable then continues about another fixed sheave 409, rotatably secured to the upper support beam 7 by suitable brackets (not shown), about a second sheave 411 of the movable-pulley block assembly 405 and is thereafter fixed to one end of a turnbuckle assembly 410 which may be adjusted to set the position of the sliding-block sheave 50 to a predetermined position.

As previously discussed, one end of each cable 301 and 321 are secured to yokes 501, 502, respectively, of a load-indicator assembly 50 to permit the machine operator to know the force being applied to the slings 100, 200, during hoist operation. To this end, an end of each cable 301 and 321 is secured to one of the yokes 501, 502, the legs of which pass through a pair of compression plates 503, 504, and are supported from an upper support beam 7 by means of a suitable bracket 505 through which the legs of the yoke 501, 502 pass. A pair of hydraulic fluid operated load cells 507, 508 are positioned such that a load cell is carried on either side of the bracket 505, and positioned in contact with and between bracket 505 and a compression plate 503 or 504. The legs of yokes 501, 502 pass through compression plate 503, 504, and bracket 505 to be fastened by means of self-locking nuts such that the load cells 507, 508 are compressed between the brackets 505 and a contiguous compression plate 503 or 504 on either side of the bracket. When a force is exerted by the load being lifted on the slings, the cables 301 and 321 are pulled taut, compressing the load cells between the compression plates and the support bracket. A suitable load cell has been found to be available from Seabee Manufacturing Company of Hampton, Iowa, or from Char-Lynn Company of Eaton Prairie, Minnesota. This compressive force is transmitted through hydraulic conduits to a pair of pressure gauges 510 where the force may be displayed on a suitable indicator for visual observation, or a suitable audible warning system, such as a bell 511, may be activated upon the force exceeding a predetermined maximum value.

While the invention has been described with reference to a preferred embodiment, it will be understood by those skilled in the art that various changes may be made and equivalents may be substituted for the elements thereof which are shown in the drawing without departing from the scope of the invention. In addition, many modifications may be made to adapt a particular situation or material to the invention without departing from the essential scope thereof. Therefore, it is intended that the invention not be limited to the particular embodiment illustrated and described as the best mode presently contemplated for carrying out this invention, but that the invention will include any embodiments falling within the scope of the appended claims.

What is claimed is:

1. A straddle-type hoist for lifting and carrying loads comprising
    a frame freely movable upon a support surface and having a lower portion open at both ends and a pair of longitudinally-extending upper support members spaced-apart in a fixed parallel position at an upper portion by a transversely-extending cross member joined to said support members at one end of said support members for forming a U-shaped frame,
    at least two vertically-movable, load-supporting slings carried by said longitudinally-extending support members, with each one of said slings extending therebetween,
    all of said load-supporting slings being carried upon said longitudinally-extending support members on a same side of said transversely-extending cross member, and movable ralative to each other for effecting lifting and varying load distribution of a load being supported thereby,
    each end of each one of said vertically-movable, load-suporting slings being operatively connected to a cable means for effecting predetermined vertical movement of the adjacent ends of said load-supporting slings relative to said support members, and
    at least two traveler means each one separately operatively connected to each one of said load-supporting slings for separately moving each one of said load-supporting slings relative to said support members and to each other.

2. The apparatus of claim 1 wherein each of said traveler means includes a hydraulic cylinderactuated pulley and cable mechanism operatively connected to each end of said load-supporting sling such that upon pressurization of said hydraulic cylinder, movement of a plunger thereof will effect movement of the end of said sling to which said hydraulic cylinder is operatively connected.

3. The apparatus of claim 1 further including load indicating means operatively connected to an end of one of said cable means operatively connected with each one of said load-supporting slings to provide indicia of the force supplied through said load-supporting slings.

4. The apparatus of claim 3 wherein said end of one of said cable means is operatively connected to said load-indicating means for applying a compressive force therethrough to a load indicia responsive component thereof.

5. A straddle-type hoist for lifting and carrying load comprising
    a frame freely movable upon a support surface end having a lower portion open at both ends and a pair of longitudinally-extending upper support members spaced-apart in a fixed parallel position at an upper portion by a transversely extending cross member joined to said support members at one end of said support members for forming a
    at least two vertically-movable, load-supporting slings carried by said longitudinally-extending support members, with each one of said slings extending therebetween,
    all of said load-supporting slings being carried upon said longitudinally-extending support members on a same side of said transversely-extending cross member, and movable relative to each other for effective varying load distribution of a load being supported thereby,
    each end of each one of said vertically-movable, load-supporting slings being operatively connected to a cable means for effecting predetermined vertical movement of the adjacent ends of said load-supporting slings relative to said support members, and
    at least two traveler means each one separately operatively connected to each one of said load-supporting slings for separately moving each one of said load-supporting slings relative to said support members and to each other,
    load indicating means operatively connected to an end of one of said cable means operatively connected with each one of said load-supporting slings to provide indicia of the force supplied through said load-supporting slings, said end of one of said cable means being operatively connected to said load-indicating means for applying a compressive force therethrough to a load indicia responsive component thereof, said load indicating means including a pair of yoke members extending in opposite directions and connected to said end of one of said cable means, said yoke members being supported from said frame by bracket means for sliding movement relative thereto, a compression plate secured to one end of each of said yoke members for movement therewith, and a load cell positioned between each of said compression plates and said bracket means for receiving a compressive force thereagainst upon movement of said yoke members relative to said bracket means.

6. The apparatus of claim 5 wherein said load cell transmits a hydraulic signal in response to a compressive force being applied thereto.

7. A straddle-type crane for lifting and carrying load comprising a frame including at least two parallel spaced, longitudinally-extending support members carried above and freely movable over a support surface, at least two load-supporting slings extending between and operatively connected to said parallel spaced support members for engaging a load to be lifted and carried, at least two cable means each one mutually exclusively supported from one of said support members and each one separately operatively connected to one end of each of said load-supporting slings for effecting simultaneous equidistant vertical movement of adjacent ends of said load-supporting slings, and vertical movement of one end of the said slings independent of the movement of the other end thereof, and separate traveler means operatively connected to each end of each one of said load-supporting slings to effect movement thereof relative to the other said load-supporting sling.

8. A straddle type crane for lifting and carrying loads comprising a frame including at least two parallel spaced upper support members fixedly positioned on one side of an upper cross member connected therewith to form a U-shaped frame having a lower portion open at both ends, at least two load-supporting slings extending between and operatively coupled to said parallel spaced fixedly positioned support members for engaging a load to be lifted and carried by said crane, at least two cable means each one mutually exclusively supported from one of said fixedly positioned upper support members and operatively connected to the ends of each one of said load-supporting slings for effecting vertical movement thereof relative to said parallel spaced fixedly positioned support members and independent of the movement of the opposite end of said load-supporting slings when engaging a load to be lifted and carried by said hoist, and all of said load-supporting slings extending between and operatively coupled to said parallel spaced fixedly positioned support members being carried by said cable means on the same side of said cross member fixedly interconnecting said two parallel spaced support members.

* * * * *

UNITED STATES PATENT AND TRADEMARK OFFICE
CERTIFICATE OF CORRECTION

PATENT NO. : 4,861,218
DATED : August 29, 1989
INVENTOR(S) : Gerald P. Lamer

It is certified that error appears in the above-identified patent and that said Letters Patent is hereby corrected as shown below:

Col. 6, line 18, please change "cylinderactuated" to --cylinder actuated--;

line 37, please change "load" to --loads--;

line 39, please change "end" to --and--;

line 45, after "a", please insert --U-shaped frame--.

Col. 7, line 23, please change "load" to --loads--.

Signed and Sealed this

Twenty-fifth Day of September, 1990

Attest:

HARRY F. MANBECK, JR.

*Attesting Officer*  *Commissioner of Patents and Trademarks*